J. W. BENNIE.
PROCESS OF TREATING COPPER ORES OR COPPER ORE MILL TAILINGS.
APPLICATION FILED MAY 18, 1911.
1,019,708.
Patented Mar. 5, 1912.
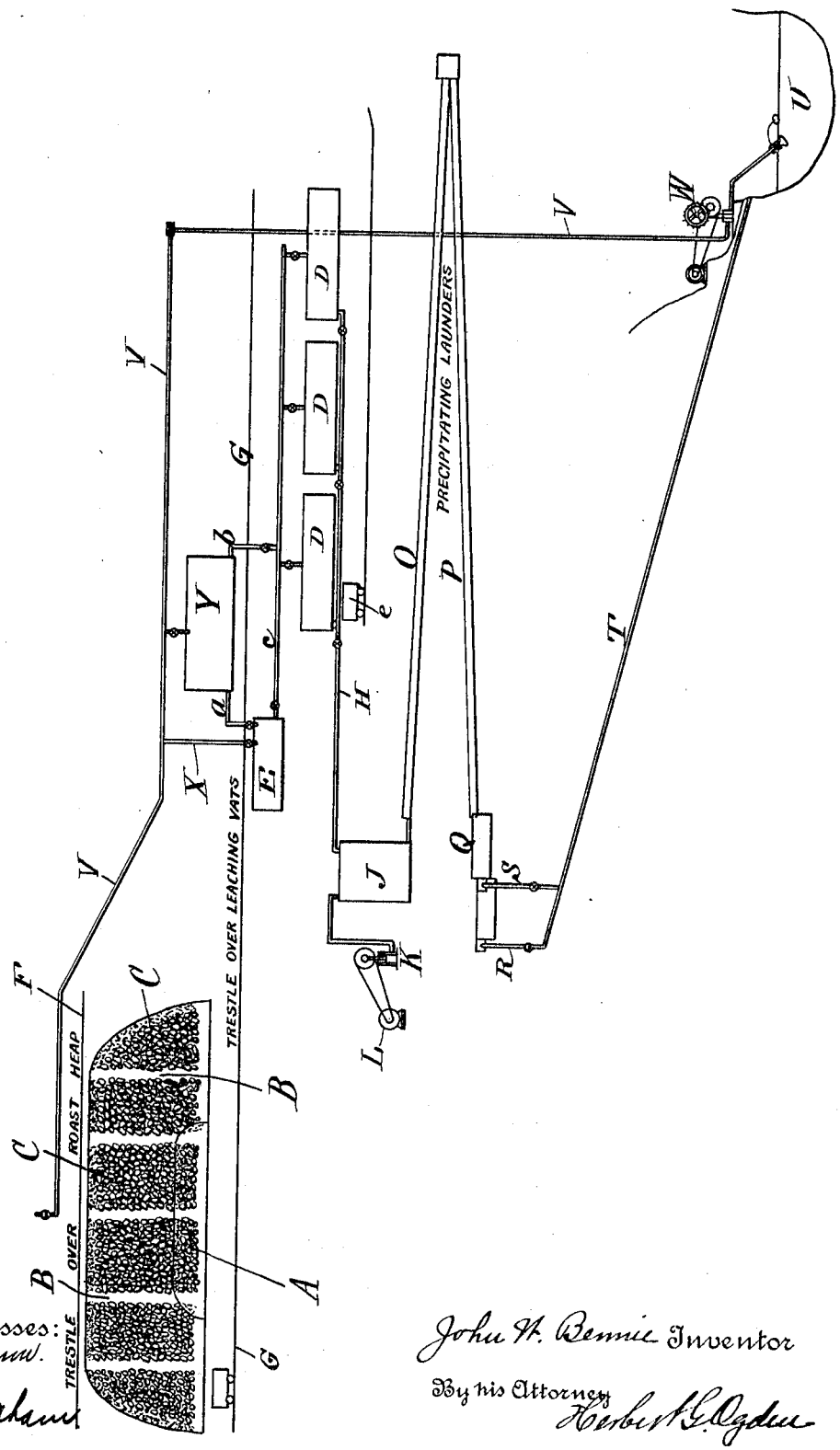

UNITED STATES PATENT OFFICE.

JOHN W. BENNIE, OF CLIFTON, ARIZONA.

PROCESS OF TREATING COPPER ORES OR COPPER-ORE-MILL TAILINGS.

1,019,708.

Specification of Letters Patent.

Patented Mar. 5, 1912.

Application filed May 18, 1911. Serial No. 628,023.

*To all whom it may concern:*

Be it known that I, JOHN W. BENNIE, a subject of Great Britain, and a resident of Clifton, Arizona, have invented certain new and useful Improvements in Processes of Treating Copper Ores or Copper-Ore-Mill Tailings, of which the following is a specification, accompanied by drawings.

This invention relates to a process of treating raw copper ores or copper ore mill tailings, by lixiviation, or leaching, and the objects of the invention are to improve upon such process, and subject the ores or tailings to a preliminary treatment before being leached.

Further objects of the invention will hereinafter appear and the drawing is a diagrammatic illustration of suitable apparatus for carrying out the process.

When iron pyrites or cuprous iron pyrites are subjected to slow roast or calcination, a part of their sulfur is given off in the form of sulfurous and sulfuric oxids, which in the presence of moisture form sulfurous and sulfuric acids. In accordance with my improved process, I subject siliceous copper ores, or copper ore mill tailings to the gases given off in the calcination of the pyrites, preferably in the presence of moisture, thereby forming sulfites and sulfates with the copper oxids, carbonates and silicates in the ores or tailings. The copper in the ores or tailings existing as sulfids more readily becomes oxidized to sulfates when exposed to an atmosphere containing oxygen and sulfurous or sulfuric oxids in the presence of moisture and heat, if ferrous and ferric salts are also present. The quantity of sulfuric oxid and ferric salts formed is increased if ferrous salts, or ferrous salts and sodium chlorid, either in the form of solution or solid crystals, are added to the pyrites or to the ores under treatment before or during calcination.

In carrying out the process which will be described in connection with the drawing, heaps of iron pyrites or cuprous iron pyrites A with proper ventilating channels B are built of any shape that may be desired, as quadrangular, triangular or conical. These heaps are ignited and as soon as calcination is started they are covered with the ores or materials C to be treated, care being taken that the covering is built to substantially conform with the shape of the pyrite heap and that proper precautions are used in the building of ventilating openings throughout the heaps.

The rapidity of the combustion or calcination of the pyrites is regulated by means of the ventilating chimneys B. Calcination is preferably prolonged as much as possible, to insure a more complete roast of the pyrites, thereby increasing the amount of ferric salts formed, and affording a longer time for the sulfurous and sulfuric oxids produced by the combustion to react on the ores and materials being treated.

The chemical reactions involved in the slow calcination of the iron sulfids or cuprous iron sulfids are well-known and are among others the following:

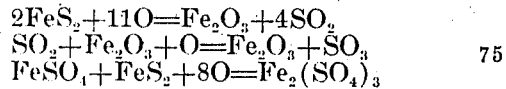

$$2FeS_2 + 11O = Fe_2O_3 + 4SO_2$$
$$SO_2 + Fe_2O_3 + O = Fe_2O_3 + SO_3$$
$$FeSO_4 + FeS_2 + 8O = Fe_2(SO_4)_3$$

The gases are allowed to permeate through the covering C without or in the presence of air and moisture, in order to form sulfites or sulfates of copper from the original copper contents of the ores or mill tailings, while the oxids or iron in the copper ores or tailings form ferrous and ferric sulfates. The copper ores may contain, for instance, cuprous carbonate, hydrate, oxid or silicate, and the chemical reactions involved are as follows for a cuprous oxid ore, which will be selected by way of example, it being understood that the reactions for other ores are analogous:

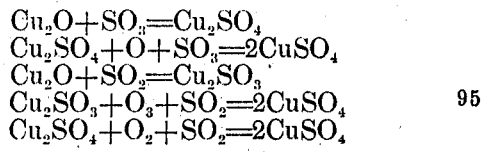

$$Cu_2O + SO_3 = Cu_2SO_4$$
$$Cu_2SO_4 + O + SO_3 = 2CuSO_4$$
$$Cu_2O + SO_2 = Cu_2SO_3$$
$$Cu_2SO_3 + O_3 + SO_2 = 2CuSO_4$$
$$Cu_2SO_4 + O_2 + SO_2 = 2CuSO_4$$

The copper salts formed by the reactions are readily soluble in ferric salts or dilute acid solutions.

Preferably while calcination is proceeding, a solution of ferrous sulfate or a solution containing ferrous sulfate and sodium chlorid is added occasionally to the heaps, in order to keep the ores moist. If the ferrous sulfate and sodium chlorid are added to the iron sulfids or cuprous iron sulfids before or during calcination, the chemical reactions involved in the roasting of the sulfids may be expressed as follows:

$$FeS_2 + FeSO_4 + 8O = Fe_2(SO_4)_3$$
or
$$FeS_2 + FeSO_4 + 8O = Fe_2O_3 + 3SO_3$$
and
$$FeS_2 + FeSO_4 + 8O + 6NaCl = Fe_2Cl_6 + 3Na_2SO_4$$

The ferrous sulfate or ferrous sulfate and sodium chlorid, may also be added to the copper ores, or copper ore mill tailings or to both, before or during calcination of the sulfid ores, with the same object of increasing the quantities of sulfurous oxid and ferric salts formed, and in the copper ores or tailings under treatment the following reactions occur:

$$2FeSO_4 + SO_3 + O = Fe_2(SO_4)_3$$
$$Fe_2(SO_4)_3 + SO_2 + 2H_2O = 2FeSO_4 + 2H_2SO_4$$
or
$$2FeSO_4 + SO_3 + 6NaCl + O = Fe_2Cl_6 + 3Na_2SO_4$$

Certain after chemical reactions occur in the copper ores or copper ore mill tailings, between the copper compounds contained in the ores or tailings and the chemical compounds above mentioned. The following reactions are typical, selecting cuprous oxid as an example:

$$Cu_2O + H_2SO_4 = Cu_2SO_4 + H_2O$$
$$Cu_2O + 2Fe_2Cl_6 = 2CuCl_2 + 4FeCl_2 + O$$
$$Cu_2O + 2Fe_2(SO_4)_3 = 2CuSO_4 + 4FeSO_4 + O$$

With cuprous sulfids the reactions are as follows:

$$Cu_2S + 2Fe_2Cl_6 = 2CuCl_2 + 4FeCl_2 + S$$
$$Cu_2S + 2Fe_2(SO_4)_3 = 2CuSO_4 + 4FeSO_4 + S$$

The quantity of the ores or tailings to be treated and used as a covering C depends on the physical character and composition of such ores or tailings and may vary from five to twenty times the amount of iron sulfids or cuprous iron sulfids used. The more sulfur in the sulfids the less the necessary quantity required. The more alkali and alkali earths in the copper ores, or copper ore mill tailings under treatment, the greater the quantity of sulfids required. This applies also to the copper contents, since the higher the percentage of copper, the greater the quantity of sulfids required. The proportion of ferrous sulfate either in solid form or in solution, or in conjunction with sodium chlorid, to be added, will also vary according to the composition of the ores or tailings. In practice, it has been found advisable to use about three tons of anhydrous ferrous sulfate to each ton of copper present in the ores or tailings. The process as will hereinafter appear is regenerative, in which the effluent liquors from the precipitation tanks supply more than the necessary ferrous sulfate required, so that the quantities to be used may be regulated to meet the requirements of each particular ore.

With some ores or tailings better results may be obtained by using chlorids instead of sulfates. As stated, sodium chlorid may be used in conjunction with ferrous sulfate and the quantity used will vary according to the ores or tailings under treatment. As will hereinafter appear, the chlorids will be returned with the effluent liquors from the precipitation tanks, so that a quantity equal to, or not to exceed, one-tenth of one per cent. of the weight of the ores under treatment should be added.

At the end of calcination of the pyrites, which may take from thirty to three hundred days, according to the size of the heaps and the rapidity of the calcination, the outside covering of the heaps A, that is the ores C under treatment, may be treated in place, or removed to tanks or reservoirs D and treated with water or suitable leaching solutions of dilute sulfuric acid or ferric salts. The copper extracted from the ores forms a copper sulfate solution, and these copper sulfate solutions may afterward be treated with metallic iron, in order to precipitate the copper, the iron passing into solution and forming ferrous sulfate. The ferrous sulfate is used as a part of the process in the treatment of the ores or tailings before or during calcination.

The roasted iron sulfids or cuprous iron sulfids A are treated in a separate tank E with a dilute solution of acid, which dissolves the ferrous and ferric salts as well as the copper salts formed during calcination. This solution is used in dissolving the copper from the ores or tailings C which have been subjected to the gases given off in calcination.

In order to illustrate the regenerative nature of the process, the apparatus has been shown in diagrammatic form.

F represents a trestle over the roast heap. G represents a trestle extending from the heap over the leaching vats or tanks D and E. The leaching tanks D are connected by a pipe H with the vacuum tank J connected to the vacuum pump K operated by the motor L. The precipitating launders O and P extend as shown from the vacuum tank J to the collecting tank Q. From the collecting tank Q, pipes R and S lead to the pipe T which in turn leads to the sump pit U. A pipe V leads from the sump to a point above the roast heap, as shown, and this pipe V is connected with a suitable pump W for pumping the solution from the sump and supplying it to the heap and tanks. A pipe X connects the pipe V with the leaching tank E. A solution tank Y is connected with the pipe V and also connected at one end with the tank E by pipe $a$ and at the other end by pipe $b$ with the supply pipe $c$ for the leaching tanks D. The pipe $c$ is also connected with the tank E.

In carrying out the process the roasted sulfid ore A is leached in the tank E, while the ore C which has been subjected to the gases given off from the calcination of the ore A is leached in the tanks D. A car $e$ carries the leached ore from the tanks D to the dump. The leached copper passes to the vacuum tank J and thence to the precipitating launders O and P, and into the collecting tank. The sump contains principally ferrous salts in solution, which are supplied to the roast heap and also supplied to the solution tank Y and the leaching vats.

I claim and desire to obtain by Letters Patent the following:

1. The process substantially as herein described of treating raw copper containing ores or copper ore mill tailings, which comprises covering a roast heap of iron sulfids or cuprous iron sulfids with raw copper containing ores or copper ore mill tailings, without roasting said raw ores or tailings, and permitting the gases generated in the roast heap to permeate the raw ores or tailings and react therewith in the presence of moisture, leaching the so treated copper containing ores or tailings with a suitable leaching solution, and precipitating the copper from the solution.

2. The process substantially as herein described of treating raw copper containing ores or copper ore mill tailings, which comprises covering a roast heap of iron sulfids or cuprous iron sulfids with raw copper containing ores or copper ore mill tailings, without roasting said raw ores or tailings, and permitting the gases generated in the roast heap to permeate the raw ores or tailings and react therewith in the presence of ferrous sulfate, leaching the so treated copper containing ores or tailings with a suitable leaching solution, precipitating the copper from the solution, and returning the effluent liquors after precipitation to a fresh quantity of the copper containing ores or tailings undergoing treatment.

3. The process substantially as herein described, of treating raw copper containing ores or copper ore mill tailings, which comprises covering a roast heap of iron sulfids or cuprous iron sulfids with raw copper containing ores or copper ore mill tailings, without roasting said raw ores or tailings, and permitting the gases generated in the roast heap to permeate the raw ores or tailings and react therewith in the presence of ferrous sulfate and sodium chlorid, leaching the so treated copper containing ores or tailings with a suitable leaching solution, precipitating the copper from the solution, and returning the effluent liquors after precipitation to a fresh quantity of the copper containing ores or tailings undergoing treatment.

4. The process substantially as herein described, of treating raw copper containing ores or copper ore mill tailings, which comprises covering a roast heap of iron sulfids or cuprous iron sulfids with raw copper containing ores or copper ore mill tailings, without roasting said raw ores or tailings, and permitting the sulfurous and sulfuric oxids generated in the roast heap to permeate the raw ores or tailings and react therewith, thereby forming sulfites and sulfates of copper with the content of the copper ores or tailings, then leaching the so treated copper ores or tailings with a suitable leaching solution of dilute acid or ferric salts, to produce a solution of copper sulfate, and finally precipitating copper from the solution.

5. The process substantially as herein described, of treating raw copper containing ores or copper ore mill tailings, which comprises covering a roast heap of iron sulfids or cuprous iron sulfids with raw copper containing ores or copper ore mill tailings, without roasting said raw ores or tailings, and permitting the sulfurous and sulfuric oxids generated in the roast heap to permeate the raw ores or tailings and react therewith, thereby forming sulfids and sulfates of copper with the content of the copper ores or tailings.

6. The process substantially as herein described, of treating raw copper containing ores or copper ore mill tailings, which comprises covering a roast heap of iron sulfids or cuprous iron sulfids with raw copper containing ores or copper ore mill tailings, without roasting said raw ores or tailings, and permitting the gases generated in the roast heap to permeate the raw ores or tailings and react therewith.

7. The process substantially as herein described, of treating raw copper containing ores or copper ore mill tailings, which comprises covering a roast heap of iron sulfids or cuprous iron sulfids with raw copper containing ores or copper ore mill tailings, without roasting said raw ores or tailings, and permitting the gases generated in the roast heap to permeate the raw ores or tailings and react therewith in the presence of moisture and with access of air.

8. The process substantially as herein described, of treating raw copper containing ores or copper ore mill tailings, which comprises covering a roast heap of iron sulfids or cuprous iron sulfids with raw copper containing ores or copper ore mill tailings, without roasting said raw ores or tailings, and permitting the gases generated in the roast heap to permeate the raw ores or tailings and react therewith in the presence of ferrous sulfate.

9. The process substantially as herein described, of treating raw copper containing ores or copper ore mill tailings, which comprises covering a roast heap of iron sulfids or cuprous iron sulfids with raw copper containing ores or copper ore mill tailings, without roasting said raw ores or tailings, and permitting the gases generated in the roast heap to permeate the raw ores or tailings and react therewith in the presence of ferrous sulfate and sodium chlorid.

10. The process substantially as herein described, of treating raw copper containing ores or copper ore mill tailings, which comprises covering a roast heap of iron sulfids or cuprous iron sulfids with raw copper containing ores or copper ore mill tailings, without roasting said raw ores or tailings, and permitting the gases generated in the roast heap to permeate the raw ores or tailings and react therewith in the presence of iron sulfate.

11. The process substantially as herein described, of treating raw copper containing ores or copper ore mill tailings, which comprises covering a roast heap of iron sulfids or cuprous iron sulfids with raw copper containing ores or copper ore mill tailings, without roasting said raw ores or tailings, and permitting the gases generated in the roast heap to permeate the raw ores or tailings and react therewith in the presence of iron sulfate and sodium chlorid.

In testimony whereof I have signed this specification in the presence of two subscribing witnesses.

JOHN W. BENNIE.

Witnesses:
P. D. RICE,
B. F. SPRIGGS.

Copies of this patent may be obtained for five cents each, by addressing the "Commissioner of Patents, Washington, D. C."